Nov. 28, 1967    W. J. SIMPSON    3,355,237
VISUAL ACUITY TESTING APPARATUS WITH TEST CHARACTERS
REPRESENTING STYLIZED HUMAN HAND
Filed Jan. 15, 1963
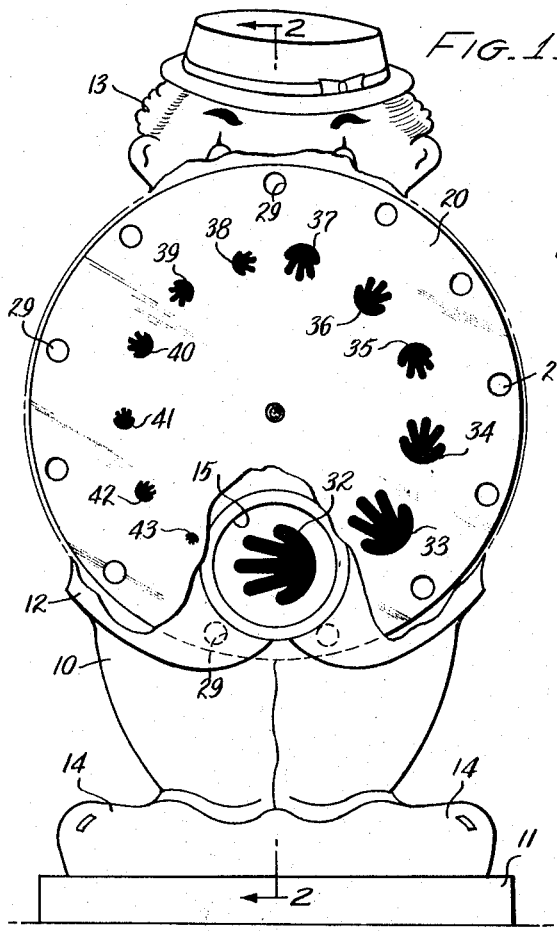
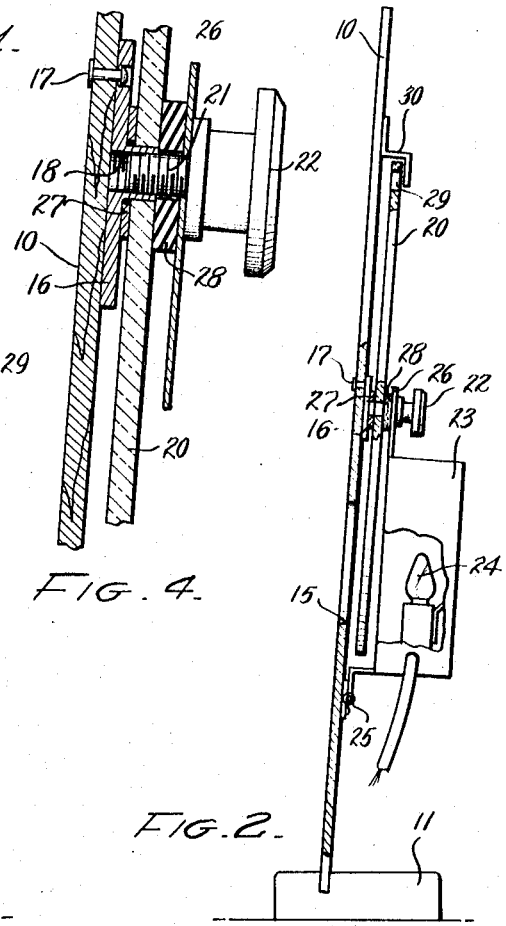
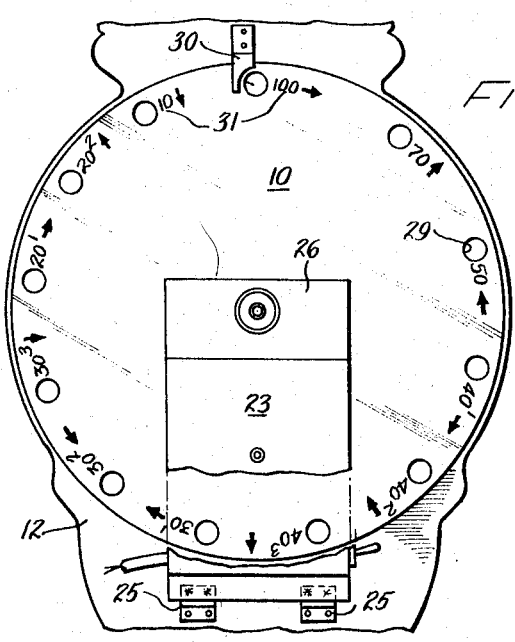
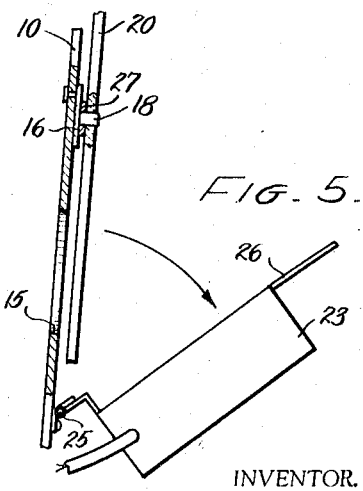
INVENTOR.
WINEA J. SIMPSON
BY
ATTORNEYS United States Patent Office 3,355,237
Patented Nov. 28, 1967

3,355,237
VISUAL ACUITY TESTING APPARATUS WITH TEST CHARACTERS REPRESENTING STYLIZED HUMAN HAND
Winea J. Simpson, P.O. Box 46,
Loma Linda, Calif. 92354
Filed Jan. 15, 1963, Ser. No. 251,692
2 Claims. (Cl. 351—37)

This invention relates to vision testing apparatus which, in the embodiment herein disclosed, is particularly adapted for testing the visual acuity of persons not capable of verbal response, such as young children.

Means and methods for testing visual acuity are known and have been developed in the past. A standard method for testing visual acuity, known as the Snellen E test, has been widely used for many years. This type of testing has been standard for testing the visual acuity of children up through the second grade. In this particular test the letter E is displayed in varying sizes and varying positions, and a child is asked to indicate which way a particular one of the displayed letters is pointing. Naturally if he can't see it he is unable to indicate which direction it is pointed and, if he is able to see it, it is assumed that he will then be able to indicate the direction in which it is pointing. It has been observed however that merely because a child is able to see a particular one of the letters it does not necessarily follow that he will be able to correctly and reliably indicate in which direction the letter is pointing. This his failure to indicate the direction in which it is pointing does not necessarily indicate a failure to see the letter.

While it has been standard practice to use the letter E for children in and below the second grade, the test is modified for children in the third grade and above by using other letters beside the letter E. This type of testing is similar to tests used for adults. However, the present application discloses a method for testing the visual acuity of children in the second grade and younger age groups.

In the established methods of administering the Snellen E test it has first been necessary to instruct the children in how to answer the test. The customary method of instruction is to explain to the children that the three horizontal lines of the letter E are like the fingers of a hand. And the children as a group are rehearsed in pointing their hands in the direction of the hands of the letter E. It should be observed here that not only can there be some failures on the part of the children to understand the analogy of the letter E to the fingers of the hand, but that this is a rather dull and dry type of routine which does not provide sufficient interest for children of this age group to stimulate them to the point where their full powers of observing and answering the test are exercised.

In administering the Snellen E test with presently standard apparatus another disadvantage appears. The practice has been to have various letters inscribed on a large cardboard or similar element and to utilize a shield with an opening in it for selectively exposing the particular one of the letters that is desired to be used at the moment. When conducting the tests according to this method the teachers or instructors find that when moving the shield around they must first look at the board on which the letters are displayed in order to properly locate the shield, and then they must turn their heads in the opposite direction to observe the child who is being tested, and they must then turn to look at the board to move the shield to a new location. This action is repeated as long as the tests are continued. As a consequence during prolonged periods of administering these tests the teacher develops a very sore neck. From a mechanical standpoint this method is obviously somewhat less efficient than might be desired.

An earlier form of the present invention was to use a board or panel portraying a figure, such as a clown with one or both hands, displayed as the means of testing the vision of the children under test. The children's observation of the hands would be the thing that they would respond to. In this prototype use was made of several hands of differing sizes and which pointed in different direction, and in this respect the established principles of the Snellen E test were followed. The original apparatus was mechanical with an electrical motor behind the clown to rotate a disc, on the periphery of which the various hands were displayed. This model had an opening for display of the hands and also included means for illuminating from the rear the disc on which the hands were displayed. In this original form of the invention the disc was a translucent plastic on which the hands were portrayed.

In this earlier form of the invention the motor drive was found unsatisfactory and the hands used at that time were substantially identical to human hands and it was found that they did not give the required degree of visual acuity in the test results as did the Snellen E charts. Another feature of this original form of the invention was that there was a hole in the clown's figure at about the collar button location where a number on the disc was visible which indicated the visual acuity then being measured. These numbers were written on the disc at points 180 degrees removed from the hand to which they corresponded and at a shorter radial distance from the center of the disc.

An important feature of the present invention is the artificial design of the hand. The present hand is inscribed in a circle with the thumb and small finger being of the same size and configuration and the symmetrical display of the three middle fingers. The dimension are such that the width of the three middle fingers at their outer ends is equal to the space between the second and third, and between the third and fourth fingers. This configuration of the hand has been found necessary and important in order to make the rate of fadeout of visibility of this design a function of decreasing size of the figure displayed, the same as for the Snellen E charts.

It is significant that there is a very clear and very definite separation between the vision threshold for discerning the presence of the test character, and the vision threshold which is subsequently achieved for determining the direction in which the test character is pointed. In accordance with the present invention the substantially circular configuration of the test character provides a very definite and sharp vision threshold for discerning its presence in the first instance. Furthermore, since the outer ends of the finger-like appendages are of substantially equal widths, and have spaces between them which are of substantially the same width as the appendages themselves, there is provided a plurality of equally separated lines (at each demarcation between light and dark areas of the character) which, at some particular viewing distance relative to the size of the character, provide a sharp and clear indication of the direction in which the character is pointing.

Another feature of the present invention is that other types of disc may be used in the same display place for the purpose of testing other visual characteristics by simply removing one and substituting another one. Such other tests may be those for color discrimination or blindness or astigmatism or the like. In the present invention a number or other indicia is placed on the rear of the disc indicating the characteristics of the particular figure that is displayed on the front of the disc. Thus when a particular disc is removed from the display apparatus and another disc substituted the control numbers or indicia are changed as a part of the disc.

With the foregoing considerations in mind it is the principal purpose and objective of the present invention to provide a novel and improved apparatus for use in vision testing.

Another object of the invention is to provide an apparatus for testing the vision of children which is peculiarly appealing to the children and maintains their interest and attention while the test is being conducted.

A further object of the invention is to provide novel apparatus for vision testing which can be used for extended periods of the time without tiring of the operator thereof.

An additional object of the invention is to provide testing apparatus of the character described in which several types of tests can be readily conducted by a simple change in a portion of the test apparatus.

Other objects and advantages of the invention will appear and be brought out more fully in the following specification, reference being had to the accompanying drawing. In the drawing:

FIGURE 1 is a face view of a preferred form of the invention.

FIGURE 2 is a sectional view taken along line 2—2 of FIGURE 1.

FIGURE 3 is a rear view of the invention.

FIGURE 4 is a sectional view showing details of the mounting shaft for the disc.

FIGURE 5 is a partial view showing the lamp housing in retracted position.

Referring more particularly to the drawing there is there shown a panel 10 of any suitable material, such as a light weight wood, mounted substantially vertically on a base 11. Panel 10 is in the general configuration of a comic figure, such as a clown, having a body 12, a head 13 and feet 14. A circular hole 15 forms a window in the lower portion of body 12. A bushing plate 16 is secured as by screws or rivets 17 to the rear side of panel 10 substantially centrally of the body 12, the bushing plate having a threaded bushing or bearing member portion 18 extending rearwardly therefrom.

A light transmitting plastic or glass disc 20 has a central bearing aperture for rotational mounting on bearing portion 18 of the bushing member, and plate 20 is held in position by a screw 21 fitting in bushing 18, the screw having a flanged head and turning knob 22. A lamp housing 23 containing a lamp 24 is pivotally secured as by hinges 25 to the rear side of panel 10 below disc 20 and has an extension portion 26 provided with a hole through which screw 21 extends whereby the lamp housing is normally held in the position shown in FIGURE 2 but may be swung outwardly and downwardly as shown in FIGURE 5 for the attachment and removal of disc 20 or for any purpose, such as the substitution of a modified disc.

A washer 27 is positioned on bearing bushing 18 between the disc and the bushing plate 16, and a resilient washer 28 is positioned on the bushing between the disc and extension 26 of the lamp housing 23. Disc 10 has a plurality of apertures 29 forming finger holes by which the disc can be turned, and a stop bracket 30 is suitably secured to the rear of panel 10 immediately above the disc to serve as a finger stop when the disc is turned. Suitably inscribed on the back disc 10 are indicia 31 comprising the notations 10, 20–2, 20–1, 30–3, 30–2, 30–1, 40–3, 40–2, 40–1, 50, 70, and 100.

The face of disc 10 bears a plurality of symbols, indicated at 32 to 43 inclusive, each representing a human hand and preferably of opaque character so as to be clearly visible when looked at through window 15 against the background of the translucent disc 20. These hands are not true representations of a human hand but rather a modification thereof; for example the thumb and little finger are of the same size and shape while the first and third fingers are of equal length. Additionally the finger thickness is substantially uniform, and the spacing at the end of the fingers is substantially equal to the width of one of the fingers. These hands have the fingers pointed or directed in different directions and the direction each hand points is indicated by an arrow adjacent each finger hole 29. For example the hand 32 is pointed to the left and is the largest hand and an arrow points to the right adjacent the finger hole adjacent stop bracket 30 and the notation 100 appears adjacent this finger hole. Correspondingly the next smaller hand 33 is pointed upwardly, that is to say toward the center of the disc and the arrow adjacent the finger hole bearing the notation 70 is correspondingly directed upwardly. In like manner indicia 31 appears adjacent each finger hole 29 and together with its associated arrow corresponds to the size of the several hands and the directions the fingers thereof are pointing.

The operation of the invention should be clear from the foregoing description. The testing apparatus of this invention is positioned at an optimum distance from the child to be tested, for example 20 feet. The teacher or the person doing the testing stands behind the apparatus and with the disc positioned as shown in the drawing the test is started. Assuming the child correctly identifies the position of the hand 32 the disc is turned so that hand 33 is presented at the window 15. This action is repeated until the child is unable to correctly see each hand and identify the direction that the fingers are pointing, thus the visual acuity of the child can be determined.

Inasmuch as the tester, standing either directly or at an angle behind the apparatus, always knows from the indicia 31 the size of the hand being shown and the direction the fingers are pointing it is unnecessary for the tester to turn his or her head repeatedly during the test as is required to be done with the Snellen E type of testing. As indicated above the disc 20 can be readily removed from the apparatus and a substitute disc installed if a different type of test is desired such as might indicate other eye conditions such as fusion, hyperopia, or color-blindness.

It will be understood that the foregoing description is illustrative rather than restrictive of the invention and that changes and modifications may be made without departing from the spirit and scope of the subjoined claims. For example while the panel 10 is shown as having the configuration of a figure such as a clown, this is done only as a matter of choice and is a figure which, having an amusing aspect, holds the interest of young children. The panel can of course have other configurations such as of animals, or it may be plain. Also other test characters than the hands may be substituted, such as different articles for showing direction, including pointers, fingers, or guns, to cite only a few examples with which children are readily familiar.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is,

1. In a device for testing visual acuity; a generally flat opaque member having an opening therethrough; a translucent disc pivotally mounted on one side of said member on an axis spaced from said opening; a plurality of opaque means on said disc, each defining a visual acuity test character, each test character comprising a stylized representation of a human hand with the fingers and thumb thereof all pointing in the same general direction, the thumb and little finger being of the same size and configuration, said hand being symmetrical about a center line extending along the middle finger, the circumscribing outline of each representation being substantially circular and the width of the fingers being substantially equal to the width of spaces therebetween, at least adjacent said circular outline; each representation differing from certain others in the direction of orientation of their fingers on said disc and differing from the remaining representations in the size of their circular outlines; said characters being positioned on said disc to be selectively visible through said opening, from the other side of said member, upon rotation of said disc; and cooperating indicia and index means on said one side of said member and on said disc for identifying the particular character then visible through said opening and the direction of orientation of the fingers thereof.

2. A device as defined in claim 1 wherein said member is configured and the other side thereof decorated to represent a human figure; said opening being positioned in a portion of said member simulating the torso of said figure whereby a character visible in said opening simulates a hand of said figure.

References Cited

UNITED STATES PATENTS

| | | | |
|---|---|---|---|
| 2,001,024 | 5/1935 | Idzal | 351—2 |
| 2,225,846 | 12/1940 | Russell | 351—36 |
| 2,282,494 | 5/1942 | Potter | 351—36 |
| 2,573,546 | 10/1951 | Costenbader et al. | 351—37 |
| 3,011,394 | 12/1961 | Sherman et al. | 351—33 |

FOREIGN PATENTS

| | | |
|---|---|---|
| 10,533 | 1909 | Great Britain. |
| 910,433 | 1/1946 | France. |

DAVID H. RUBIN, *Primary Examiner.*